United States Patent
Kong

(10) Patent No.: US 9,958,746 B2
(45) Date of Patent: May 1, 2018

(54) LIQUID CRYSTAL DISPLAY

(71) Applicant: LG Display Co., Ltd., Seoul (KR)

(72) Inventor: ChungSik Kong, Paju-si (KR)

(73) Assignee: LG Display Co., Ltd., Seoul (KR)

( * ) Notice: Subject to any disclaimer, the term of this patent is extended or adjusted under 35 U.S.C. 154(b) by 95 days.

(21) Appl. No.: 14/673,653

(22) Filed: Mar. 30, 2015

(65) Prior Publication Data

US 2015/0277201 A1 Oct. 1, 2015

(30) Foreign Application Priority Data

Mar. 31, 2014 (KR) .................. 10-2014-0037991

(51) Int. Cl.
*G02F 1/1362* (2006.01)
*G02F 1/1335* (2006.01)
*G02F 1/1333* (2006.01)
*G02F 1/1339* (2006.01)
*G02F 1/1337* (2006.01)

(52) U.S. Cl.
CPC .. *G02F 1/136227* (2013.01); *G02F 1/133512* (2013.01); *G02F 1/133707* (2013.01); *G02F 2001/13396* (2013.01); *G02F 2001/133357* (2013.01); *G02F 2201/40* (2013.01)

(58) Field of Classification Search
CPC ......... G02F 1/136227; G02F 1/133512; G02F 1/1339; G02F 1/136286; G02F 2001/133357; G02F 2001/13396; G02F 2001/136295; G02F 1/133555; G02F 1/1368; G02F 2201/40; G02F 2203/09; G02F 1/13394; G02F 1/133707; G09G 2300/0426; H01L 27/124; H01L 27/3276

USPC ....... 349/42, 43, 46, 48, 155, 157, 114, 138; 345/55, 103
See application file for complete search history.

(56) References Cited

U.S. PATENT DOCUMENTS

| | | | | |
|---|---|---|---|---|
| 7,760,309 B2* | 7/2010 | Ahn | ................... | G02F 1/133555 349/141 |
| 7,929,105 B2* | 4/2011 | Yamamoto | .......... | G02F 1/13394 349/155 |
| 8,081,286 B2* | 12/2011 | Kim | ..................... | G02F 1/13394 349/106 |
| 8,300,295 B2* | 10/2012 | Hiroshima | ............ | G02F 1/1368 257/351 |
| 8,345,177 B2* | 1/2013 | Chang | ............... | G02F 1/136227 349/42 |
| 2011/0181805 A1* | 7/2011 | Nagami | ............ | G02F 1/134363 349/43 |

(Continued)

*Primary Examiner* — Angela Davison
(74) *Attorney, Agent, or Firm* — Fenwick & West LLP

(57) ABSTRACT

Disclosed herein is a liquid crystal display in which a hole is shared by thin-film transistors to thereby improve the aperture ratio. The liquid crystal display includes a substrate, a first thin-film transistor and a second thin-film transistor on the substrate. In the planarization film, a single hole is disposed to expose a portion of the source electrode or the drain electrode from each of the first thin-film transistor and the second thin-film transistor. Each of the first and second pixel electrodes is connected to the source electrode or the drain electrode of the first and second thin-film transistors via the single hole in the planarization film. Accordingly, the area of a black matrix is reduced and thus the aperture ratio of the liquid crystal display 100 can be improved.

18 Claims, 5 Drawing Sheets

(56) References Cited

U.S. PATENT DOCUMENTS

2013/0342779 A1* 12/2013 Jung .................... G02B 6/0083
349/43
2014/0306223 A1* 10/2014 Ono ...................... H01L 27/124
257/59

* cited by examiner

LIQUID CRYSTAL DISPLAY

CROSS-REFERENCE TO RELATED APPLICATIONS

This application claims the priority of Korean Patent Application No. 10-2014-0037991 filed on Mar. 31, 2014, in the Korean Intellectual Property Office, the disclosure of which is incorporated herein by reference.

BACKGROUND OF THE INVENTION

Field of the Invention

The present disclosure relates to a liquid crystal display. More specifically, the present disclosure relates to a liquid crystal display in which thin-film transistors in adjacent pixels share a contact hole thereby improving the aperture ratio.

Description of the Related Art

Liquid crystal displays refer to displays including a liquid crystal layer. Liquid crystal displays are driven by adjusting transmittance of light from a light source such as a backlight unit. Recently, the demand for liquid crystal display with a high resolution and a low power consumption is increasing.

A liquid crystal display is comprised of a plurality of pixels. In order to drive the plurality of pixels, the display includes a plurality of thin-film transistors. To improve the aperture ratio of liquid crystal displays, it is important to reduce the areas where thin-film transistors are formed, which do not transmit light. By improving the aperture ratio of liquid crystal displays, the brightness of liquid crystal displays can be increased to display brighter images. Additionally, liquid crystal displays can consume less power to achieve the brightness provided in existing displays.

In this regard, there have been numerous approaches to improve the aperture ratio of liquid crystal displays by reducing the regions where thin-film transistors are formed. For example, an approach has been proposed in which thin-film transistors in two pixels would share one gate line. In this approach, however, sharing agate line would require new designs for drivers of a liquid crystal display. Further, even the aperture ratio would not be improved substantially.

Also, reducing the regions where thin-film transistors are formed by reducing the size of a hole in a planarization film has been proposed to improve the aperture ratio. In this approach, however, the size of the hole in the planarization film cannot be reduced beyond a certain size due to thickness of the planarization film and the limitation of equipment such as an exposure device and an etch equipment.

SUMMARY OF THE INVENTION

Accordingly, a novel liquid crystal display, which can improve the aperture ratio without being restricted by limitations, needs to be developed.

In addition, there are more problems to consider: light leakage may occur when liquid crystals behave abnormally due to a difference in level in the planarization film around the hole; and a defective cell may occur when an alignment film is damaged by a cell gap column spacer placed in the regions where thin-film transistors are disposed.

Accordingly, for liquid crystal displays, the aperture ratio needs to be improved and the problems, such as light leakage and a red-eye phenomenon in the regions where thin-film transistors are disposed, have to be solved.

In view of the above, an object of the present disclosure is to provide a liquid crystal display that can minimize regions where thin-film transistors and lines are disposed and maximize the aperture ratio in such a manner that a hole in a planarization film that connects thin-film transistors to pixel electrodes is shared by two adjacent thin-film transistors.

Another object of the present disclosure is to provide a liquid crystal display that can minimize light leakage caused by the difference in level in a planarization film around a hole by disposing the hole between gate lines.

Another object of the present disclosure is to provide a liquid crystal display that minimizes a red-eye phenomenon which occurs when an alignment film is damaged by a cell gap column spacer by disposing a latch column spacer in a hole in a planarization film.

It should be noted that objects of the present invention are not limited to the above-described object, and other objects of the present invention will be apparent to those skilled in the art from the following descriptions.

According to an aspect of the present disclosure, there is provided a liquid crystal display according to an exemplary embodiment of the present disclosure. The liquid crystal display includes a substrate, and a first thin-film transistor and a second thin-film transistor on the substrate. The first thin-film transistor and the second thin-film transistor are disposed on the substrate. Each of the first thin-film transistor and the second thin-film transistor includes an active layer, a gate electrode, a source electrode and a drain electrode. Over the first thin-film transistor and the second thin-film transistor, a planarization film is disposed. In the planarization film, a single hole is disposed to expose at least portion of the source electrode or the drain electrode of each of the first thin-film transistor and the second thin-film transistor. A first pixel electrode is connected to the source electrode or the drain electrode of the first thin-film transistor. A second pixel electrode is connected to the source electrode or the drain electrode of the second thin-film transistor. Additionally, the first pixel electrode and the second pixel electrode are connected to the source electrode or the drain electrode of the first thin-film transistor and that of the second thin-film transistor, respectively, via the single hole in the planarization film. As the average size of the holes in the planarization film 160 becomes smaller, so does the region where thin-film transistors are disposed. Accordingly, the area of a black matrix is reduced and thus the aperture ratio of the liquid crystal display 100 can be improved.

The liquid crystal display may further include: a first gate line connected to the gate electrode of the first thin-film transistor; and a second gate line connected to the gate electrode of the second thin-film transistor. The single hole in the planarization film may be disposed between the first gate line and the second gate line.

The side surfaces of the single hole in the planarization film may be located on inner sides of the first gate line and the second gate line.

The liquid crystal display may further include: an upper substrate facing the substrate; and a black matrix disposed on the upper substrate. The black matrix may overlap the first gate line and the second gate line.

The liquid crystal display may further include: an upper substrate facing the substrate; and a latch column spacer disposed on the upper substrate. The latch column spacer may be disposed at a position corresponding to a position where the single hole is disposed.

The latch column spacer may be accommodated in the single hole.

The liquid crystal display may further include: a cell gap column spacer disposed on the upper substrate. The height of the latch column spacer may be larger than that of the cell gap column spacer.

The first pixel electrode and the second pixel electrode may be disposed in the single hole in the planarization film such that they are spaced apart from each other.

The source electrode of the first thin-film transistor and the source electrode of the second thin-film transistor, or the drain electrode of the first thin-film transistor and the drain electrode of the second thin-film transistor may be located symmetrically to each other and exposed in the single hole in the planarization film.

The single hole may have a quadrangular shape when viewed from the above. The length of a side of the quadrangular shape may be between 3.5 μm and 25 μm.

The single hole may have a circular shape when viewed from the above. The diameter of the circular shape may be between 3.5 μm and 25 μm.

According to another aspect of the present invention, there is provided a liquid crystal display according to another exemplary embodiment of the present disclosure. The liquid crystal display may include a substrate having a first sub-pixel region and a second sub-pixel region. On the substrate, at least a first gate line and a second gate line may be disposed. Between the first gate line and the second gate line, a first thin-film transistor and a second thin-film transistor may be disposed. Each of the thin-film transistors may have an active layer, a gate electrode, a source electrode and a drain electrode. Between the first gate line and the second gate line, a planarization film having a single hole may be disposed. A first electrode may be disposed in the first sub-pixel region and may be connected to the source electrode or the drain electrode of the first thin-film transistor via the single hole. A second electrode may be disposed in the second sub-pixel region and may be connected to the source electrode or the drain electrode of the second thin-film transistor via the single hole. When the single hole in the planarization film is disposed between the first gate line and the second gate line, light leakage due to a level difference in the hole can be minimized by simply disposing a black matrix to overlap the first gate line and the second gate line. As a result, the aperture ratio of the liquid crystal display is improved.

The liquid crystal display may further include: an alignment film disposed over the first pixel electrode and the second pixel electrode; and a column spacer located above the alignment film and in the single hole in the planarization film.

The substrate may include a third sub-pixel region disposed in the same row as and adjacent to the second sub-pixel region. The liquid crystal display may further include: a third gate line located on an opposite side of the second gate line with respect to the third sub-pixel region; and a third thin-film transistor comprising an active layer, a gate electrode connected to the third gate line, a source electrode and a drain electrode.

The second gate line and the third gate line may be configured to transfer the same gate signal.

The first sub-pixel region and the second sub-pixel region may be disposed symmetric with respect to the single hole in the planarization film.

The first pixel electrode may traverse the first gate line to be extended to the first sub-pixel region. The second pixel electrode may traverse the second gate line to be extended to the second sub-pixel region.

The substrate may include a fourth sub-pixel region disposed in the same column as and adjacent to the second sub-pixel region. The area between the second sub-pixel region and the fourth sub-pixel region may be smaller than the area between the first sub-pixel region and the second sub-pixel region.

According to the present disclosure, a liquid crystal display can maximize the aperture ratio in such a manner that a hole in a planarization film for connecting thin-film transistors to pixel electrodes is shared by two adjacent thin-film transistors.

Further, a liquid crystal display can minimize light leakage that occurs at side surfaces of a hole in a planarization film by disposing the hole between gate lines.

Moreover, a liquid crystal display can minimize a red eye phenomenon that occurs when an alignment film is damaged by a column spacer by disposing a latch column spacer in a hole in a planarization film.

It should be noted that effects of the present invention are not limited to those described above and other effects of the present invention will be apparent to those skilled in the art from the following descriptions.

BRIEF DESCRIPTION OF THE DRAWINGS

The above and other aspects, features and other advantages of the present invention will be more clearly understood from the following detailed description taken in conjunction with the accompanying drawings, in which.

DETAILED DESCRIPTION OF THE PREFERRED EMBODIMENT

Figure 1:
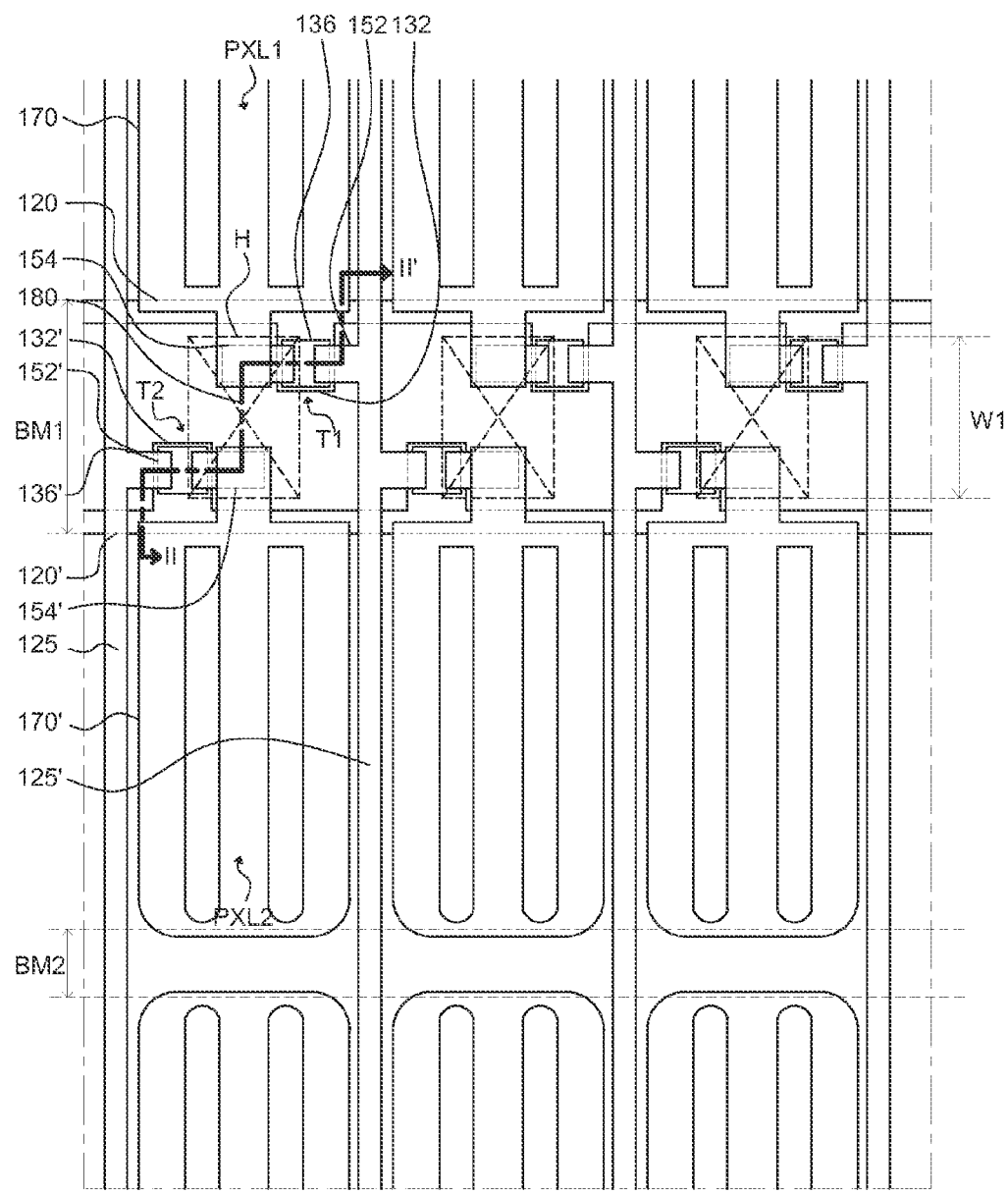
FIG. 1 is a plane view of a liquid crystal display according to an exemplary embodiment of the present disclosure.

Advantages and features of the present invention and methods to achieve them will become apparent from the descriptions of exemplary embodiments herein below with reference to the accompanying drawings. However, the present invention is not limited to exemplary embodiments disclosed herein but may be implemented in various different forms. The exemplary embodiments are provided for making the disclosure of the present invention thorough and for fully conveying the scope of the present invention to those skilled in the art. It is to be noted that the scope of the present invention is defined only by the claims.

As used herein, a phrase "an element A on an element B"

Advantages and features of the present invention and methods to achieve them will become apparent from the descriptions of exemplary embodiments herein below with reference to the accompanying drawings. However, the present invention is not limited to exemplary embodiments disclosed herein but may be implemented in various different ways. The exemplary embodiments are provided for making the disclosure of the present invention thorough and for fully conveying the scope of the present invention to those skilled in the art. It is to be noted that the scope of the present invention is defined only by the claims.

As used herein, a phrase "an element A on an element B" suggests/means that the element A may be disposed directly on the element B and/or that the element A may be disposed indirectly on the element B via another element C.

Although terms such as first, second, etc. are used to distinguish arbitrarily between the elements, such terms describe and these terms are not necessarily intended to indicate temporal or other prioritization of such elements. Theses terms are used to merely distinguish one element from another. Accordingly, as used herein, a first element may be a second element within the technical scope of the present invention.

Like reference numerals denote like elements throughout the descriptions.

The drawings are not to scale and the relative dimensions of various elements in the drawings are depicted schematically and not necessarily to scale.

Features of various exemplary embodiments of the present invention may be combined partially or totally. As will be clearly appreciated by those skilled in the art, technically various interactions and operations are possible. Various exemplary embodiments can be practiced individually or in combination.

Hereinafter, exemplary embodiments of the present invention will be described in detail with reference to the accompanying drawings.

Figure 2:
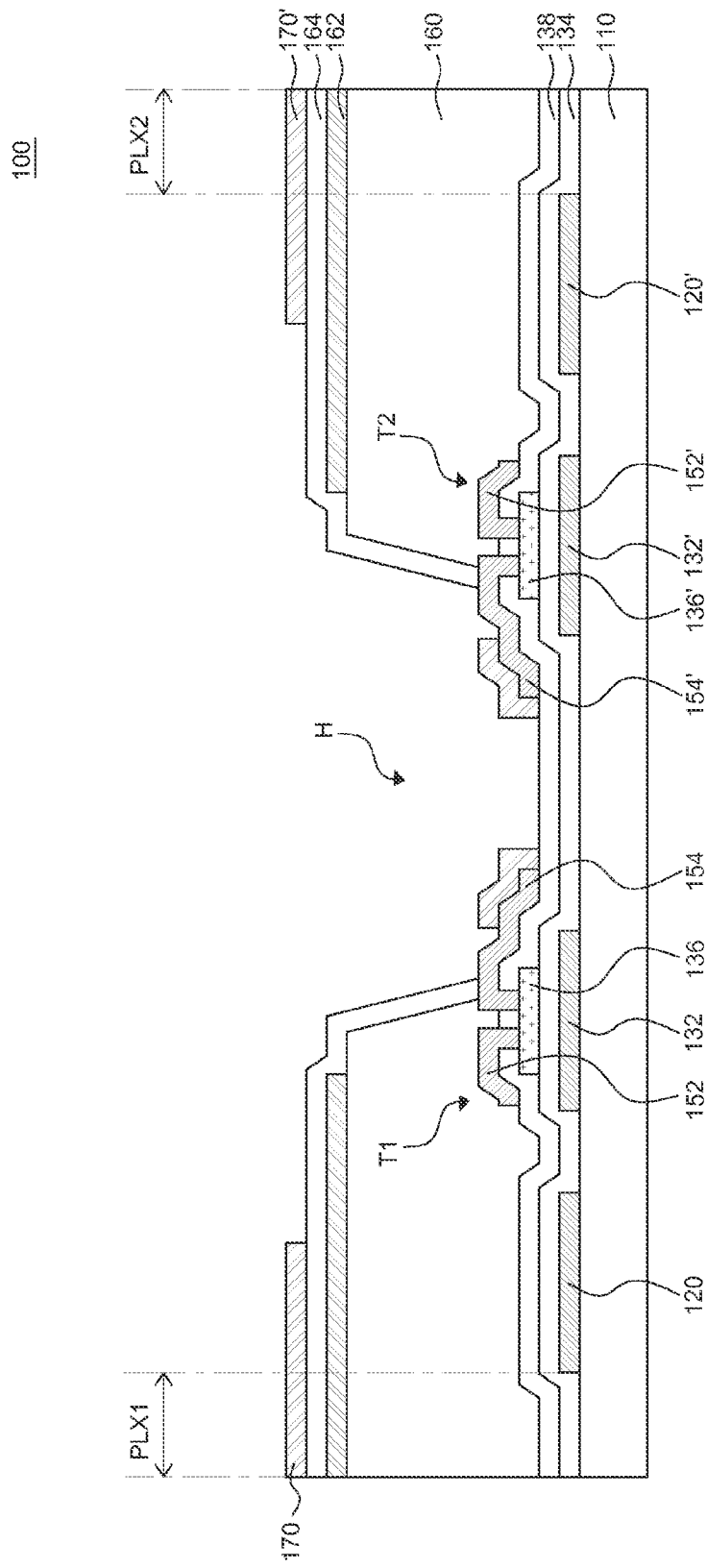
FIG. 2 is a cross-sectional view of the liquid crystal display, taken along line II-II' of FIG. 1.

FIG. 1 is a plane view of a liquid crystal display according to an exemplary embodiment of the present disclosure. FIG. 2 is a cross-sectional view of the liquid crystal display, taken along line II-II' of FIG. 1. Referring to FIGS. 1 and 2, the liquid crystal display 100 includes a lower substrate 110, a first thin-film transistor T1, a second thin-film transistor T2, a first gate line 120, a second gate line 120', a first data line 125, a second data line 125', a common electrode 162, a first pixel electrode 170 and a second pixel electrode 170'.

Referring to FIG. 1, the lower substrate 110 has a plurality of sub-pixel regions including a first sub-pixel region PXL1 and a second sub-pixel region PXL2. That is, the lower substrate 110 has an array of pixels, and each pixel has a plurality of sub-pixel region. Each of the sub-pixel regions displays one of red, green and blue colors. In FIG. 1, the sub-pixel regions are arranged in a column, such that the first sub-pixel region PXL1 and the second sub-pixel region PXL2, may emit light of the same color while every three sub-pixel regions arranged in a row may emit red light, green light and blue light, respectively.

Referring to FIG. 1, a drain electrode 154 of the first thin-film transistor T1 and a drain electrode 154' of the second thin-film transistor T2 are disposed on a line parallel to the data line 125. However, in some embodiments, the drain electrode 154 of the first thin-film transistor T1 and the drain electrode 154' of the second thin-film transistor T2 may be disposed on a line parallel to the gate line 120. Alternatively, the drain electrode 154 of the first thin-film transistor T1 and the drain electrode 154' of the second thin-film transistor T2 may be disposed in a variety of ways so that they are exposed via a single hole H in a planarization film 160, which will be described below. By disposing the drain electrode 154 of the first thin-film transistor T1 and the drain electrode 154' of the second thin-film transistor T2 on a line, it becomes easier to share the single hole H in the planarization film 160. Also, the source electrode 152 of the first thin-film transistor T1 and the source electrode 152' of the second thin-film transistor T2 can be located symmetrically to each other in the single hole H. In addition, the drain electrodes 154 and 154' of the first and second thin-film transistors T1 and T2 can be located symmetrically to each other in the single hole H. Hereinafter, the first thin-film transistor T1 and the second thin-film transistor T2 will be described with reference to FIG. 2.

Referring to FIG. 2, the first thin-film transistor T1 and the second thin-film transistor T2 are disposed on the lower substrate 110. The first thin-film transistor T1 and the second thin-film transistor T2 are inverted staggered thin-film transistors and have gate electrodes 132 and 132', active layers 136 and 136', source electrodes 152 and 152', and drain electrodes 154 and 154', respectively. Specifically, the gate electrodes 132 and 132' are disposed on the lower substrate 110. A gate insulation film 134 is disposed over the gate electrodes 132 and 132'. Active layers 136 and 136' are disposed on the gate insulation film 134. An etch stop layer 138 is disposed over the active layers 136 and 136'. The source electrodes 152 and 152' and the drain electrodes 154 and 154' are electrically connected to the active layers 136 and 136', respectively. The first thin-film transistor T1 and the second thin-film transistor T2 are inverted staggered thin-film transistors herein. However, the structure of the thin-film transistors is not limited thereto and the thin-film transistors with various structures, such as coplanar thin-film transistors, may be used. Further, although the etch stop layer 138 is disposed in FIGS. 1 and 2, it may be eliminated if amorphous silicon thin-film transistors or poly silicon thin-film transistors are employed. Additionally, the etch stop layer 138 may be eliminated if thin-film transistors including oxide semiconductor are employed.

In addition, the first thin-film transistor T1 and the second thin-film transistor T2 are p-type thin-film transistors in FIG. 2. Accordingly the pixel electrodes 170 and 170' are connected to the drain electrodes 154 and 154', respectively. However, if the first thin-film transistor T1 and the second thin-film transistor T2 are n-type thin-film transistors, the pixel electrodes 170 and 170' may be connected to the source electrodes 152 and 152', respectively.

Over the first thin-film transistor T1 and the second thin-film transistor T2, the planarization film 160 is disposed. The planarization film 160 serves to protect the thin-film transistors and provides a flat surface for the pixel electrodes 170 and 170' and the common electrode 162. The planarization film 160 is made of an organic material such as photo acryl.

In the liquid crystal display 100 according to an exemplary embodiment of the present disclosure, the planarization film 160 has the single hole H that exposes at least a portion of the drain electrodes 154 and 154' of the first and second thin-film transistors T1 and T2, respectively.

Referring to FIG. 2, the first pixel electrode 170 of the first sub-pixel region PXL1 is connected to the drain electrode 154 of the first thin-film transistor T1 via the single hole H. Likewise, the second pixel electrode 170' of the second sub-pixel region PXL2 is connected to the drain electrode 154' of the second thin-film transistor T2 via the single hole H.

In the related art, a hole is located in every sub-pixel region to connect a thin-film transistor in a planarization film to a pixel electrode. However, in this instance, the size of the hole cannot be reduced beyond a certain size due to limitation of processing equipment such as an exposure device or etcher. In contrast, as in the liquid crystal display 100 according to an exemplary embodiment of the present disclosure, by disposing the single hole H shared by the thin-film transistors in adjacent sub-pixel regions in the planarization film 160, the average size of the holes is significantly reduced compared to that in the related art, even when the same processing equipment is used.

Referring to FIG. 1, the single hole H in the planarization film 160 has a quadrangular shape when viewed from the above. Referring to FIG. 1, for the width W1 of one side of the quadrangular, the single hole H may range from 3.5 µm to 25 µm. Due to the limitation of processing equipment, it is difficult to make the width W1 of one side of the single hole H to be less than 3.5 µm. Additionally, if the width W1 of one side of the single hole H is less than 3.5 µm, the first pixel electrode 170 and the second pixel electrode 170' may not be sufficiently spaced apart from each other within the single hole H. If the single hole is larger than 25 µm for the width W1 of one side of the quadrangular, there may be no merit for a hole to be disposed in a planarization film for every sub-pixel region in terms of the aperture ratio.

Although not shown in FIGS. 1 and 2, alternatively, the single hole H in the planarization film 160 may have a circular shape when viewed from the above. In this instance, the diameter of the single hole H may range from 3.5 µm to 25 µm.

In the related art, a hole that connects a thin-film transistor in a planarization film to a pixel electrode has the dimensions of 13 µm by 15 µm. In contrast, in the liquid crystal display 100 according to an exemplary embodiment of the present disclosure, the single hole H shared by the thin-film transistors in adjacent sub-pixel regions is disposed in the planarization film 160, so that the single hole H has the dimensions of, for example, 18 µm by 20.5 µm.

In short, the holes that are each disposed in every sub-pixel region have the average dimensions of 13 µm by 15 µm, while the single holes H that are each disposed between every two adjacent sub-pixel regions have the average dimension of 9 µm by 10.25 µm. Therefore, it can be seen that the size of the hole in the planarization film 160 is significantly reduced.

As the average size of the holes in the planarization film 160 becomes smaller, so do the regions where thin-film transistors are disposed. Accordingly, the area of a black matrix is reduced and thus the aperture ratio of the liquid crystal display 100 can be improved.

More specifically, in the liquid crystal display 100 according to an exemplary embodiment of the present disclosure, the width of BM2 is smaller than the width of BM1 in FIG. 1. The width of BM1 might be larger than the width of conventional pixels. However, the reduction in the width of BM2 decreases the average width of BM1 and BM2. Therefore, the size of areas of the thin-film transistors and a black matrix is decreased on average. Accordingly, when a hole is disposed in every sub-pixel region, the average widths of BM1 and BM2 in FIG. 1 are reduced.

Table 1 below compares aperture ratios of liquid crystal displays that exhibit the resolution of 326 ppi with pixels having dimensions of 26.0 µm by 78.0 µm, and liquid crystal displays that exhibit the resolution of 264 ppi with pixels having dimensions of 32.0 µm by 96.0 µm.

TABLE 1

| | Average Width of BM | Aperture Ratio | Structure Type |
|---|---|---|---|
| Inventive Example 1 | 13 µm | 63.3% | 26.0 × 78.0 µm, 326 ppi, LTPS |
| Comparative Example 1 | 17 µm | 59.1% | 26.0 × 78.0 µm, 326 ppi, LTPS |
| Inventive Example 2 | 23.5 µm | 53.7% | 32.0 × 96.0 µm, 264 ppi, Oxide 1 |
| Comparative Example 2 | 26.25 µm | 50.8% | 32.0 × 96.0 µm, 264 ppi, Oxide 1 |
| Inventive Example 3 | 28.25 µm | 52.43% | 32.0 × 96.0 µm, 264 ppi, Oxide 2 |
| Comparative Example 3 | 30 µm | 51.12% | 32.0 × 96.0 µm, 264 ppi, Oxide 2 |

In Inventive Example 1, a liquid crystal display, in which a hole in a planarization film is shared by two thin-film transistors, is implemented with thin-film transistors. The thin-film transistors each have a poly silicon active layer that exhibits the resolution of 326 ppi and each pixel has the dimension of 26.0 µm by 78.0 µm.

Comparative Example 1 is identical to Inventive Example 1 except that each thin-film transistor uses its own hole in a planarization film.

In Inventive Example 2, a liquid crystal display, in which a hole in a planarization film is shared by two thin-film transistors, is implemented with thin-film transistors. The thin-film transistors each has an oxide active layer to exhibit the resolution of 264 ppi and each pixel has the dimension of 32.0 µm by 96.0 µm.

Comparative Example 2 is identical to Inventive Example 2 except that each thin-film transistor uses its own hole in a planarization film.

In Inventive Example 3, a liquid crystal display, in which a hole in a planarization film is shared by two thin-film transistors, is implemented with thin-film transistors. The thin-film transistors each has an oxide active layer to exhibit the resolution of 264 ppi and each pixel has the dimension of 32.0 µm by 96.0 µm. The thin-film transistors in Inventive Example 3 have different designs from those in Inventive Example 2.

Comparative Example 3 is identical to the Inventive Example 3 except that each thin-film transistor uses its own hole in a planarization film.

As can be seen from Table 1, the average width of black matrixes in Inventive Examples 1 to 3 where the single hole in the planarization film is shared by two sub-pixel regions is reduced from 1.75 µm to 4 µm, which can be compared to the widths in Comparative Examples 1 to 3. In accordance with this, the aperture ratio of the liquid crystal display 100 is also increased from 1% to 4.2%.

In the liquid crystal display 100 according to an exemplary embodiment of the present disclosure, the thin-film transistors T1 and T2 are connected to the pixel electrodes 170 and 170', respectively, via the single hole H in the planarization film 160. From this, the aperture ratio of the liquid crystal display 100 is increased. As a result, brighter images are displayed and further, images that would have otherwise required more energy to produce a certain level of brightness are displayed by using less power.

Referring to FIG. 2, the single hole H in the planarization film 160 is disposed between the first gate line 120 and the second gate line 120'. In the liquid crystal display 100 according to an exemplary embodiment of the present disclosure, additional advantages are provided in addition to improvement in the aperture ratio. The advantage can be achieved by disposing the single hole H in the planarization film 160 between the first gate line 120 and the second gate line 120'.

As the hole is disposed in the planarization film 160, a difference in levels is created between the region where thin-film transistors are disposed and the region where the pixel electrodes 170 and 170' and the common electrode 162 are disposed. Due to the difference in levels, liquid crystals near the side surface of the planarization film 160 may not be normally aligned. If the liquid crystals are not normally aligned, light leakage from a light source may occur near the hole in the planarization film 160 when the liquid crystal display is operated in black.

To minimize such light leakage, existing liquid crystal displays have a black matrix that overlaps the region near the hole in the planarization film. However, such a black matrix has to be larger than the region near the hole, which would consequently decrease the aperture ratio of the liquid crystal display.

Instead, in the liquid crystal display 100 according to an exemplary embodiment of the present disclosure, the side surfaces of the single hole H in the planarization film 160 are located between the first gate line 120 and the second gate line 120'. Accordingly, light leakage possibly occurring near the single hole H in the planarization film 160 can be substantially blocked by the first gate line 120, the second gate line 120', the first data line 125 and the second data line 125'. Consequently, unlike the existing liquid crystal displays, to minimize light leakage, a black matrix does not have to be larger than the first gate line 120 and the second gate line 120' but it only has to cover them. Therefore, the aperture ratio of the liquid crystal display 100 is improved.

Referring to FIG. 2, the common electrode 162 is disposed on the planarization film 160. Over the common electrode 162, a passivation film 164 is disposed to insulate the common electrode 162 from the pixel electrodes 170 and 170'. The passivation film 164 covers the common electrode 162 and is extended along the side surfaces of the planarization film 160 to a portion of the drain electrode 154 of the first thin-film transistor T1 and the drain electrode 154' of the second thin-film transistor T2. The passivation film 164 may be eliminated depending on the driving manner of the liquid crystal display 100. The passivation film 164 may cover only a portion of the common electrode 162.

The first pixel electrode 170 is disposed on the passivation film 164 in patterns. The first pixel electrode 170 is extended into the single hole H in the planarization film 160 to be electrically connected to the drain electrode 154 of the first thin-film transistor T1. The second pixel electrode 170' is also disposed on the passivation film 164 in patterns. The second pixel electrode 170' is extended into the single hole H in the planarization film 160 to be electrically connected to the drain electrode 154' of the second thin-film transistor T2.

Referring to FIG. 1, the first sub-pixel region PXL1 and the second sub-pixel region PXL2 are symmetric with respect to the single hole H in the planarization film 160. As the first sub-pixel region PXL1 and the second sub-pixel region PXL2 are symmetric with respect to the single hole H, the region where the first thin-film transistor T1 and the second thin-film transistor T2 are disposed can be minimized.

The first pixel electrode 170 traverses the first gate line 120 to be extended in the first sub-pixel region PXL1. The second pixel electrode 170' traverses the second gate line 120' to be extended in the second sub-pixel region PXL2. In the liquid crystal display 100 according to an exemplary embodiment of the present disclosure, the first sub-pixel region PXL1 and the first thin-film transistor T1 are disposed in the first gate line 120 therebetween. Therefore, the first pixel electrode 170 connected to the first thin-film transistor T1 is disposed such that it traverses the first gate line 120 below the planarization film 160 to be extended in the first sub-pixel region PXL1.

The first pixel electrode 170 and the second pixel electrode 170' are disposed in the single hole H in the planarization film 160 such that they are spaced apart from each other. The first pixel electrode 170 and the second pixel electrode 170', which are spaced apart from each other, control liquid crystals in the first sub-pixel region PXL1 and the second sub-pixel region PXL2, respectively, by an alignment film.

In FIGS. 1 and 2, the liquid crystal display 100 of an IPS (In-Plane Switching) type is shown, with the pixel electrodes 170 and 170' above the common electrode 162. However, the structure of the liquid crystal display 100 is not limited thereto but may include an IPS type with the common electrode 162 above the pixel electrodes 170 and 170' or an IPS type with the pixel electrodes 170 and 170' on the same layer as the common electrode 162. The shape of the common electrode 162 and the pixel electrodes 170 and 170' may be a straight line, or may be a zigzag line having at least one curve. The color filter and the black matrix disposed on the upper substrate 190 can also be disposed in a zigzag line having at least one curve.

Further, the common electrode 162 or the pixel electrodes 170 and 170' may have a rectangular shape. The pixel electrodes 170 and 170' or the common electrode 162 may have a straight line shape or a zigzag shape having at least one curve. Namely, the shapes of the common electrode 162, the pixel electrodes 170 and 170', the color filter and the black matrix applied in the IPS types are not intended to be limiting. Since the liquid crystal display 100 in FIGS. 1 and 2 is of an IPS type, the common electrode 162 is disposed only on the side of the lower substrate 110 and not on the side of the upper substrate 190.

Figure 3:
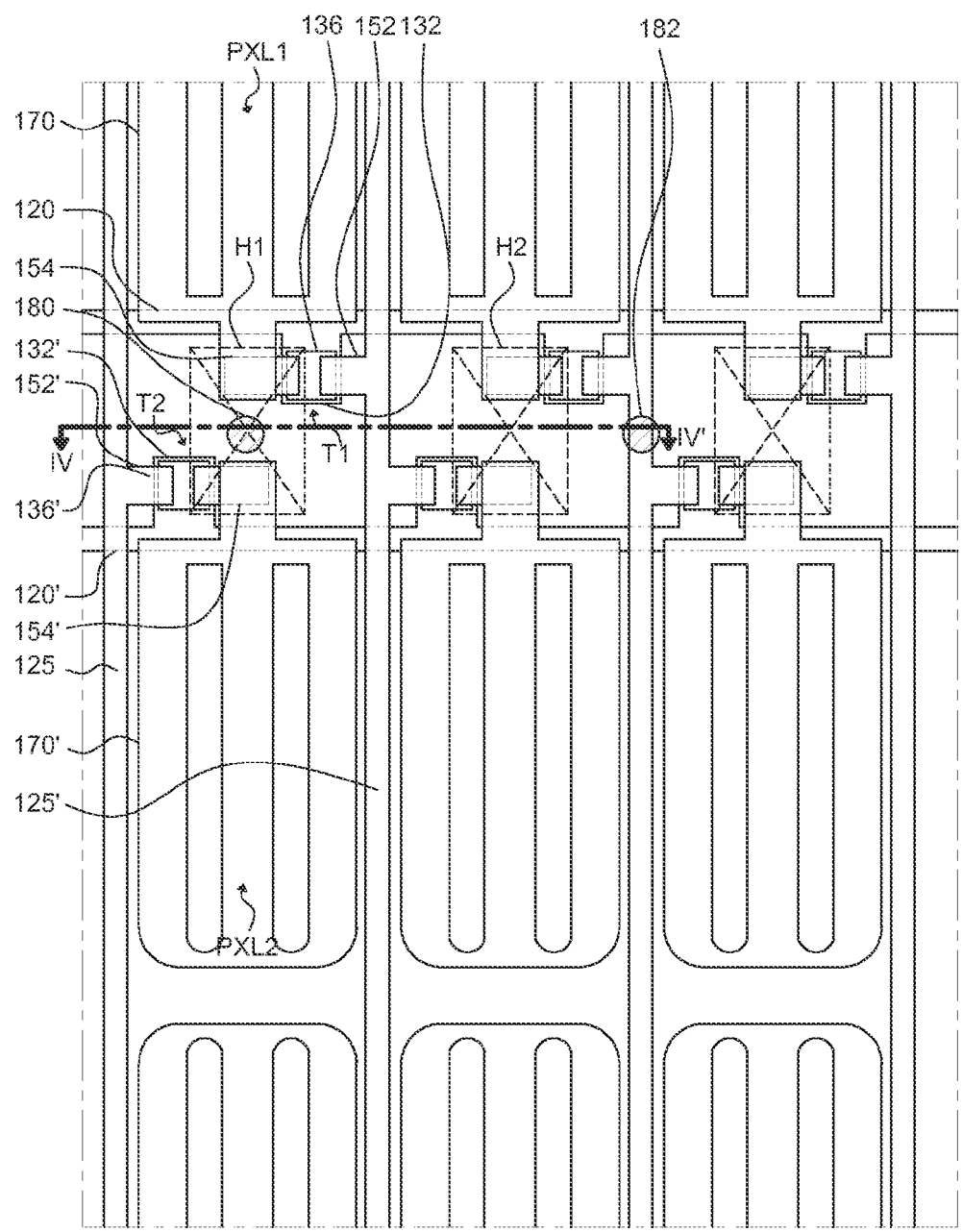
FIG. 3 is a plane view that illustrates a liquid crystal display with a latch column spacer according to an exemplary embodiment of the present disclosure.
Figure 4:
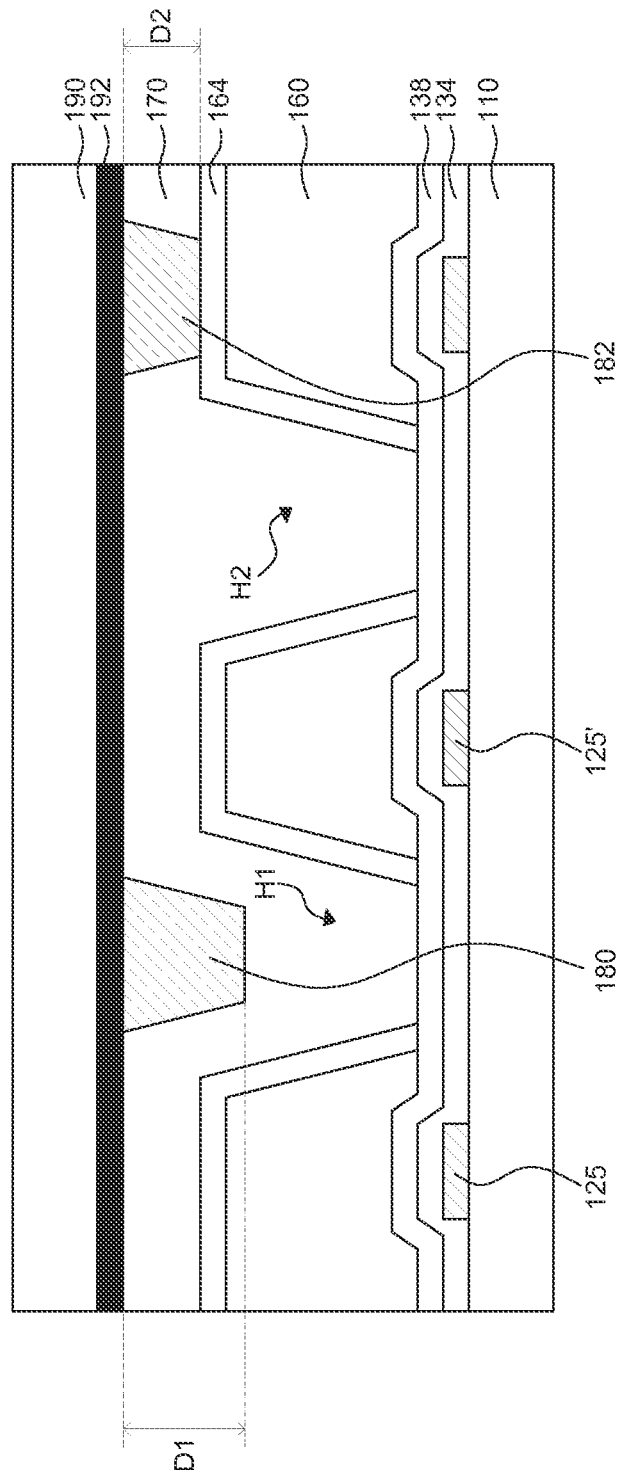
FIG. 4 is a cross-sectional view of the liquid crystal display, taken along line IV-IV' of FIG. 3.

FIG. 3 is a plane view that illustrates a liquid crystal display including a latch column spacer according to an exemplary embodiment of the present disclosure. FIG. 4 is a cross-sectional view of the liquid crystal display, taken along line IV-IV' of FIG. 3.

The liquid crystal display 100 shown in FIGS. 3 and 4 further includes, in addition to the elements shown in FIGS. 1 and 2, a cell gap column spacer 182, a latch column spacer 180 disposed on a position corresponding to where the single hole in the planarization film 160 is disposed, and the upper substrate 190.

Referring to FIG. 3, a cell gap column spacer 182 is disposed between the thin-film transistors T1 and T2. The cell gap column spacer 182 refers to a column-like spacer that keeps a liquid crystal cell gap a constant thickness between the upper substrate 190 and the lower substrate 110.

In the liquid crystal display 100 according to an exemplary embodiment of the present disclosure, a latch column spacer 180 is further disposed in addition to the cell gap column spacer 182. The latch column spacer 180 is disposed on a position corresponding to where the single hole H1 in the planarization film 160 is disposed. The latch column spacer 180 is disposed smaller than the single hole H1 in the planarization film 160 so that it can be accommodated in the single hole H1 in the planarization film 160.

Referring to FIG. 4, the cell gap column spacer 182 and the latch column spacer 180 are disposed on the upper substrate 190 where the black matrix 192 is disposed. The cell gap spacer 182 comes in contact with an element on the lower substrate 110. The cell gap column spacer 182 comes in contact with an alignment film when the upper substrate 190 is coupled with the lower substrate 110.

As described above, the latch column spacer 180 is disposed on a position corresponding to where the single hole H1 in the planarization film 160 is disposed, and it eventually can be accommodated in the single hole H1. For the latch column spacer 180 to be accommodated in the single hole H1 in the planarization film 160, the height D1 of the latch column spacer 180 has to be larger than the height D2 of the cell gap column spacer 182. Since the height D1 of the latch column spacer 180 is larger than the height D2 of the cell gap column spacer 182, the latch column spacer 180 on the position corresponding to where the single hole H1 is disposed is placed in the single hole H1 in the planarization film 160 when the cell gap column spacer 182 comes in contact with the alignment film.

In existing liquid crystal displays, an alignment film may be damaged, e.g., scraped when the cell gap column spacer 182 is moved due to an external impact or the like. This results in a red-eye phenomenon in the liquid crystal displays. A red-eye phenomenon occurs when an alignment film is scraped by a cell gap spacer or the like and the alignment film fails to normally control liquid crystals.

In the liquid crystal display 100 according to an exemplary embodiment of the present disclosure, the single hole H1 in the planarization film 160 is sized/adjusted to fit the latch column spacer 180. For example, the latch column spacer 180 has a diameter of approximately 6 μm. The single hole H1 in the planarization film 160 has dimension of 18.0 μm by 20.5 μm, for example. Accordingly, the latch column spacer 180 may fit in the single hole H1 in the planarization film 160 with a margin of at least 5 μm. The latch column spacer 180 fits in the single hole H1 in the planarization film 160 as shown in FIG. 4, so that it works as a fastening mechanism between the upper substrate 190 and the lower substrate 110. This minimizes the movement of the cell gap column spacer 182. By reducing the movement of the cell gap column spacer 182, both damage in an alignment film caused by the cell gap column spacer 182 and a red-eye phenomenon can also be minimized.

Figure 5:
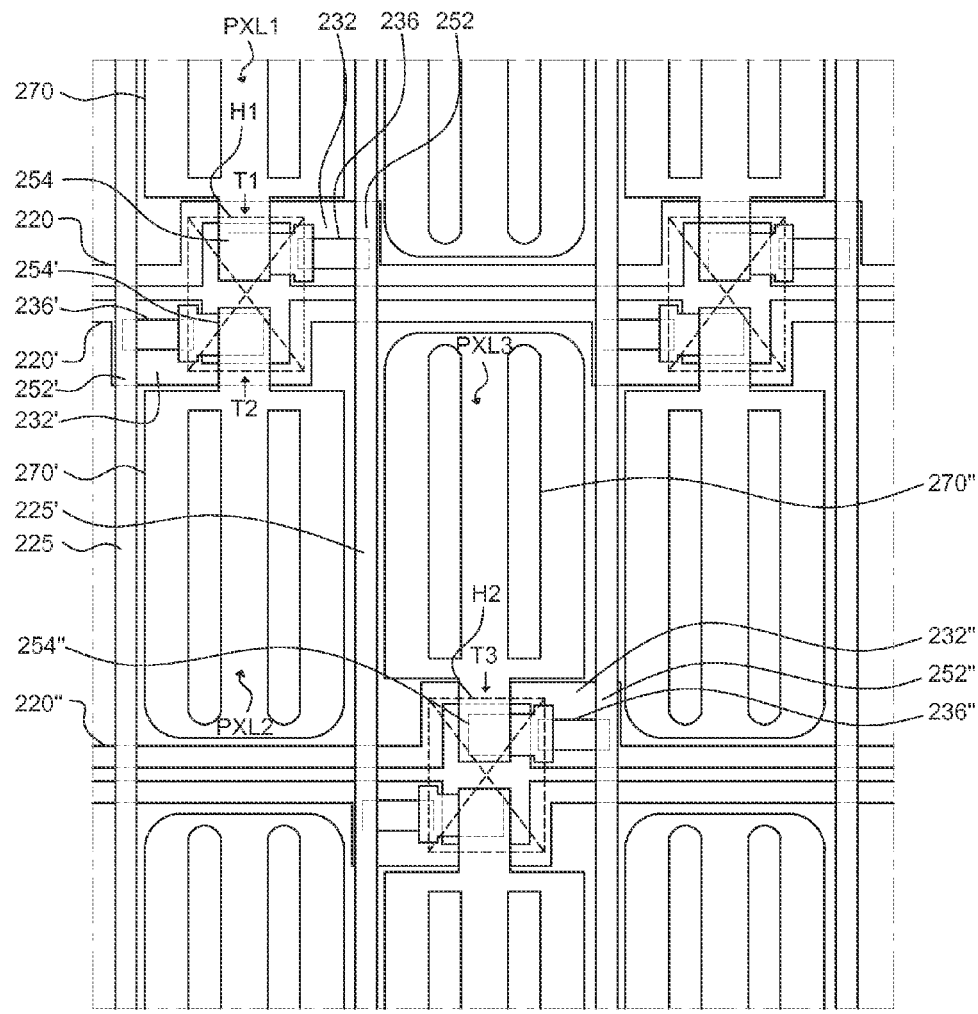
FIG. 5 is a plane view of a liquid crystal display according to another exemplary embodiment of the present disclosure.

FIG. 5 is a plane view of a liquid crystal display according to another exemplary embodiment of the present disclosure. The elements of the thin-film transistors disposed in the liquid crystal display of FIG. 5 are substantially identical to those of FIG. 1; and, therefore, the redundant description will be omitted. In a liquid crystal display according to this exemplary embodiment of the present disclosure, the regions where light-emitting transistors are disposed are arranged in a zigzag pattern.

The liquid crystal display includes a third sub-pixel region PXL3 that is disposed in the same row as and adjacent to a second sub-pixel region PXL2. The liquid crystal display includes a third thin-film transistor T3. The third thin-film transistor has a third gate line 220" on the opposite side of the second gate line 220' with respect to the third sub-pixel region PXL3, an active layer 236", a gate electrode 232" connected to the third gate line 220", a source electrode 252", and a drain electrode 254".

If there is a difference in widths between BM1 and BM2 as in the liquid crystal display of FIG. 1, a horizontal line may be visible in an image depending on the resolution of the liquid crystal display. This may result from sub-pixels that are densely arranged in pairs.

In contrast, if the regions where disposed thin-film transistors are arranged in a zigzag pattern in the liquid crystal display as shown in FIG. 5, the horizontal line can be eliminated without harming the aperture ratio of the liquid crystal display.

The second gate line 220' and the third gate line 220" are configured to transfer the same gate signal. The second sub-pixel region PXL2 and the third sub-pixel region PXL3 are arranged in the same row and thus receive a signal from the same gate signal. The second gate line 220' and the third gate line 220" are electrically connected to each other at a location where no sub-pixel region is disposed, e.g., a peripheral region of the liquid crystal display.

The first gate line 220 and the second gate line 220' pass through a region above the third sub-pixel region PXL3 where no thin-film transistor is disposed. In this region, the first gate line 220 and the second gate line 220' are disposed as close as possible to minimize reduction in the aperture ratio.

Thus far, exemplary embodiments of the present invention have been described in detail with reference to the accompanying drawings. However, the present invention is not limited to the exemplary embodiments, and modifications and variations can be made thereto without departing from the technical idea of the present invention. Accordingly, the exemplary embodiments described herein are merely illustrative and are not intended to limit the scope of the present invention. The technical idea of the present invention is not limited by the exemplary embodiments. Therefore, it should be understood that the above-described embodiments are not limiting but illustrative in all aspects. The scope of protection sought by the present invention is defined by the appended claims and all equivalents thereof are construed to be within the true scope of the present invention.

What is claimed is:

1. A liquid crystal display comprising:
   a substrate;
   a first thin-film transistor and a second thin-film transistor on the substrate, each of the first and second thin-film transistors comprising an active layer, a gate electrode, a source electrode and a drain electrode;
   a planarization film over the first thin-film transistor and the second thin-film transistor having a single hole such that at least a part of a top surface of the source electrode or the drain electrode of each of the first thin-film transistor and the second thin-film transistor is not covered by the planarization film;
   a first pixel electrode being in direct contact with at least the part of the top surface of the source electrode or the drain electrode of the first thin-film transistor and disposed on the planarization film;
   a second pixel electrode being in direct contact with at least the part of the top surface of the source electrode or the drain electrode of the second thin-film transistor and disposed on the planarization film;
   an upper substrate facing the substrate;
   a latch column spacer on the upper substrate, the latch column spacer being located between the first thin-film transistor and the second thin-film transistor within a region of the single hole; and
   a cell gap column spacer on the upper substrate,
   wherein the first pixel electrode and the second pixel electrode are connected to the source electrode or the drain electrode of the first thin-film transistor and that of the second thin-film transistor, respectively, via the single hole of the planarization film.

2. The liquid crystal display of claim 1, further comprising:
   a first gate line connected to the gate electrode of the first thin-film transistor; and
   a second gate line connected to the gate electrode of the second thin-film transistor,
   wherein the single hole of the planarization film is located between the first gate line and the second gate line.

3. The liquid crystal display of claim 2, wherein side surfaces of the single hole of the planarization film are located on inner sides of the first gate line and the second gate line.

4. The liquid crystal display of claim 2, further comprising:
an upper substrate facing the substrate; and
a black matrix on the upper substrate,
wherein the black matrix overlaps the first gate line and the second gate line.

5. The liquid crystal display of claim 1, wherein the latch column spacer is accommodated in the single hole.

6. The liquid crystal display of claim 1, wherein a height of the latch column spacer is larger than that of the cell gap column spacer.

7. The liquid crystal display of claim 1, wherein the first pixel electrode and the second pixel electrode are in the single hole of the planarization film spaced apart from each other.

8. The liquid crystal display of claim 1, wherein the source electrode of the first thin-film transistor and the source electrode of the second thin-film transistor, or the drain electrode of the first thin-film transistor and the drain electrode of the second thin-film transistor are located symmetrically to each other and are not covered by the planarization film in the single hole in the planarization film.

9. The liquid crystal display of claim 1, wherein the single hole has a quadrangular shape when viewed from above, wherein a length of a side of the quadrangular shape is between 3.5 µm and 25 µm.

10. The liquid crystal display of claim 1, wherein the single hole has a circular shape when viewed from above, wherein a diameter of the circular shape is between 3.5 µm and 25 µm.

11. A liquid crystal display comprising:
a substrate having an array of pixels, each pixel having a plurality of sub-pixel regions;
a first gate line and a second gate line on the substrate;
a first thin-film transistor and a second thin-film transistor between the first gate line and the second gate line, each of the first and second thin-film transistors comprising an active layer, a gate electrode, a source electrode and a drain electrode;
a planarization film over the first thin-film transistor and the second thin-film transistor, the planarization film having a single hole between the first gate line and the second gate line;
a first pixel electrode in a first sub-pixel region of a first pixel disposed on the planarization film and connected to a top surface of the source electrode or the drain electrode of the first thin-film transistor via the single hole;
a second pixel electrode in a second sub-pixel region of a second pixel disposed on the planarization film and connected to a top surface of the source electrode or the drain electrode of the second thin-film transistor via the single hole, wherein the first pixel electrode and the second pixel electrode are spaced apart from each other in the single hole;
an alignment film disposed over the first pixel electrode and the second pixel electrode; and
a column spacer located above the alignment film, and between the first thin-film transistor and the second thin-film transistor within a region of the single hole in the planarization film,
wherein the column spacer is fitted in the single hole in the planarization film with a margin of at least 5 µm and a size of the single hole is larger than a size of the column spacer.

12. The liquid crystal display of claim 11, wherein the substrate further has a third sub-pixel region disposed in a same row as and adjacent to the second sub-pixel region, and wherein the liquid crystal display further comprises:
a third gate line located on an opposite side of the second gate line with respect to the third sub-pixel region; and
a third thin-film transistor comprising an active layer, a gate electrode connected to the third gate line, a source electrode and a drain electrode.

13. The liquid crystal display of claim 12, wherein the second gate line and the third gate line are configured to transfer a same gate signal.

14. The liquid crystal display of claim 11, wherein the first sub-pixel region and the second sub-pixel region are symmetric with respect to the single hole in the planarization film.

15. The liquid crystal display of claim 11, wherein the first pixel electrode traverses the first gate line to be extended to the first sub-pixel region, and the second pixel electrode traverses the second gate line to be extended to the second sub-pixel region.

16. The liquid crystal display of claim 11, wherein the substrate comprises a fourth sub-pixel region disposed in a same column as and adjacent to the second sub-pixel region, and wherein an area between the second sub-pixel region and the fourth sub-pixel region is smaller than an area between the first sub-pixel region and the second sub-pixel region.

17. A display device comprising:
an array of thin-film transistors (TFTs) on a substrate having a matrix of pixels;
an array of pixel electrodes over the array of TFTs and corresponding to the matrix of pixels;
a planarization film over the array of TFTs and configured to have a plurality of common contact holes; and
a latch column spacer provided within one or more of the common contact holes,
each common contact hole being configured to allow electrical connection of two adjacent TFTs to their respective pixel electrodes by being commonly shared by the two adjacent TFTs, and each common contact hole is located between two adjacent gate lines on the substrate, wherein each of the two adjacent pixel electrodes is connected to each of two adjacent TFTs in the common contact hole and each of the two adjacent pixel electrodes is spaced apart from each other in the common contact hole,
wherein the latch column spacer is at a position corresponding to a position of each common contact hole and located between the two adjacent TFTs within the position of each common contact hole.

18. The display device of claim 17, wherein at least one of a source electrode and a drain electrode of each of the two adjacent TFTs are in the common contact hole.

* * * * *